US007174148B2

(12) United States Patent
Chang

(10) Patent No.: US 7,174,148 B2
(45) Date of Patent: Feb. 6, 2007

(54) RECEIVER HOUSING WITH FREQUENCY RESPONSE IMPROVEMENT

(75) Inventor: Jui-Cheng Chang, Taichung (TW)

(73) Assignee: Merry Electronics, Co., Ltd., Taichung (TW)

( * ) Notice: Subject to any disclaimer, the term of this patent is extended or adjusted under 35 U.S.C. 154(b) by 605 days.

(21) Appl. No.: 10/678,273

(22) Filed: Oct. 6, 2003

(65) Prior Publication Data

US 2005/0075091 A1 Apr. 7, 2005

(51) Int. Cl.
*H04B 1/08* (2006.01)
*H04B 1/38* (2006.01)
*H04M 1/00* (2006.01)

(52) U.S. Cl. .................. 455/347; 455/90.3; 455/575.1

(58) Field of Classification Search ................ 455/347, 455/325, 327, 349, 575.1, 90.3, 348
See application file for complete search history.

(56) References Cited

U.S. PATENT DOCUMENTS

| | | | | |
|---|---|---|---|---|
| 4,843,477 | A * | 6/1989 | Mizutani et al. | 348/837 |
| 5,966,647 | A * | 10/1999 | Sawai | 455/300 |
| 2006/0166698 | A1* | 7/2006 | Saiki et al. | 455/550.1 |

* cited by examiner

*Primary Examiner*—Tilahun Gesesse
(74) *Attorney, Agent, or Firm*—Browdy and Neimark, PLLC

(57) ABSTRACT

A receiver includes a rear yoke inside a housing, a first acoustic paper bonded to an annular base of the rear yoke to block a rear open side of a tubular body of the rear yoke, an annular magnet supported on the annular base around the tubular body, a front yoke disposed at a front side of the magnet, a vibration diaphragm stretched in front of the yokes, a voice coil suspended in an annular space between the yokes, a tubular cushion fitted into the tubular body of the rear yoke, and an annular cushion (or annular step) set between the magnet and the tubular body, and a second acoustic paper covering an air hole at a rear side of the housing.

10 Claims, 3 Drawing Sheets

RECEIVER HOUSING WITH FREQUENCY RESPONSE IMPROVEMENT

BACKGROUND OF THE INVENTION

1. Field of the Invention

The present invention relates sound generating devices and, more particularly, to a receiver with frequency response improvement.

2. Description of the Related Art

FIG. 1 shows a conventional mini receiver 60. The receiver 60 comprises a housing 62, which is comprised of a barrel-like yoke holder 64, a disk-like front cover plate 66 covering the front side of the yoke holder 64, and disk-like rear cover plate 68 covering the rear side of the yoke holder 64, a rear yoke 74 mounted inside the housing 62, the rear yoke 74 having an annular base 76 spaced from the rear cover plate 68 at a distance and a tubular body 78 forwardly extended from the inner diameter of the annular base 76, an annular magnet 82 disposed around the tubular body 78 of the rear yoke 74 without touching the periphery of the tubular body 78 and stopped at the front side of the annular base 76, a front yoke 84 disposed around the tubular body 78 of the rear yoke 74 and stopped at the front side of the annular magnet 82, a vibration diaphragm 86 stretched inside the housing 62 in front of the yokes 74 and 84, a voice coil 88 connected to the back side of the vibration diaphragm 86 at the center and suspended in the annular space between the front yoke 84 and the tubular body 78 of the rear yoke 74, and an acoustic paper 92 covering the rear open side of the tubular body 78 of the rear yoke 74. When applying an audio signal to the voice coil 88, the front yoke 84, the magnet 82 and the rear yoke 74 form a magnetic loop, thereby causing the voice coil 88 to vibrate the vibration diaphragm 86 corresponding to inputted video signal subject to Fleming's left hand rule, and to further produce sound.

It is well known that frequency response is an important index to judge the performance of a receiver. A long extension of the flat segment of frequency response curve means that the receiver can receive input signal of a relatively higher frequency or relatively lower frequency and maintain a constant output power. According to the design of the aforesaid conventional receiver, a better performance of frequency response to low frequency is achieved when increasing the internal space, i.e. the flat segment of frequency response curve extends in direction toward relatively lower frequency. On the contrary, when reducing the internal space of the receiver, the low frequency performance becomes poor. Because the aforesaid conventional receiver is commonly used in mobile apparatus, for example, a cellular telephone, there is a space limitation, i.e., low frequency performance is poor. Further, the performance of frequency response of the aforesaid conventional receiver to high frequency is still not good enough due to the effect of materials used and the limitation of internal space. The curve of imaginary line shown in FIG. 3 is a frequency response curve obtained from the aforesaid conventional receiver 60. As illustrated, the flat segment extends within the area between 300 Hz and 4 KHz, i.e., the output power of the receiver 60 drop drastically upon an input signal of frequency below 300 Hz or over 4 KHz.

Therefore, it is desirable to provide a receiver that eliminates the aforesaid drawbacks.

SUMMARY OF THE INVENTION

The present invention has been accomplished under the circumstances in view. It is therefore the main object of the present invention to provide a receiver, which has the flat segment of the frequency response curve extended wider, i.e., the receiver is capable of receiving input signal of relatively higher or relatively lower frequency and keeping a constant output power.

To achieve this object of the present invention, the receiver comprises a housing having a front side, a rear side, and a plurality of sound holes extended through the front side; a rear yoke mounted inside the housing, the rear yoke having an annular base spaced from the rear side of the housing at a distance, and a tubular body forwardly extended from an inner diameter of the annular base; an annular magnet disposed around the tubular body of the rear yoke and stopped at a front side of the annular base; a front yoke disposed around the tubular body of the rear yoke and stopped at a front side of the annular magnet; a vibration diaphragm mounted inside the housing and stretched in front of the rear yoke and the front yoke; a voice coil connected to a back side of the vibration diaphragm and suspended in an annular space between the front yoke and the tubular body of the rear yoke; and a first acoustic paper bonded to the annular base of the rear yoke to block the tubular body of the rear yoke; wherein the housing has at least one air hole in the rear side and a second acoustic paper blocking the at least one air hole; a first cushion is mounted inside the tubular body of the rear yoke, the first cushion being a tubular member having the periphery thereof disposed in contact with an inner diameter of the tubular body of the rear yoke; a second cushion mounted in an annular gap between the annular magnet and the tubular body of the rear yoke, the second cushion being an annular member having inner and outer diameters respectively disposed in contact with a periphery of the tubular body of the rear yoke and an inner diameter of the annular magnet and spaced from the front yoke at a distance. According to an alternate form of the present invention, an annular step is formed integral with a connection area between the tubular body and annular base of the rear yoke to substitute for the aforesaid second cushion.

DETAILED DESCRIPTION OF THE INVENTION

Figure 1:
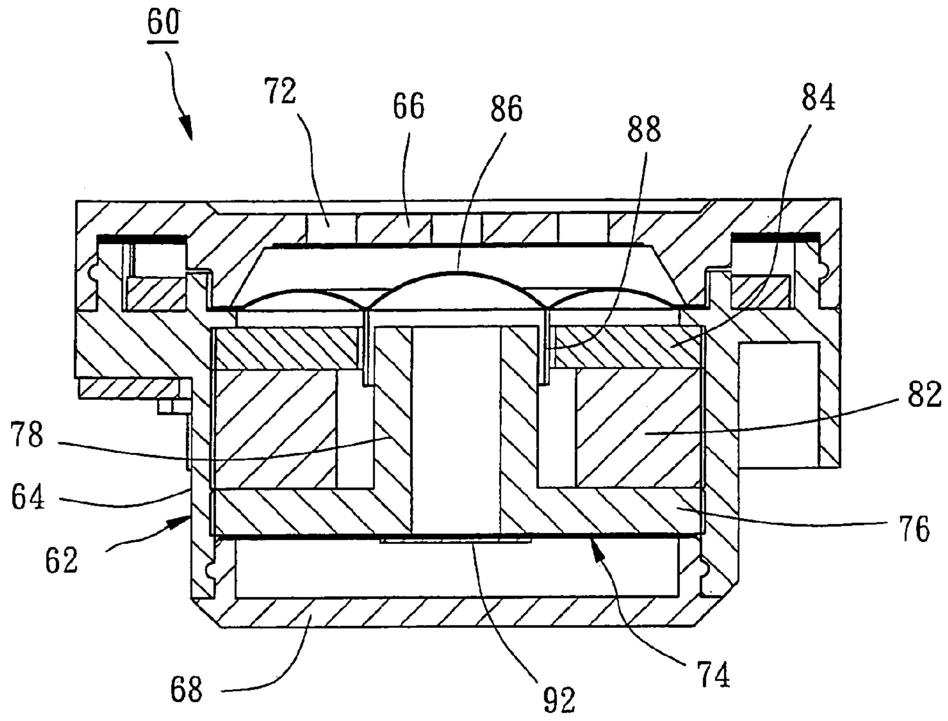
FIG. 1 PRIOR ART
FIG. 1 is a sectional view of a receiver according to the prior art.
Figure 2:
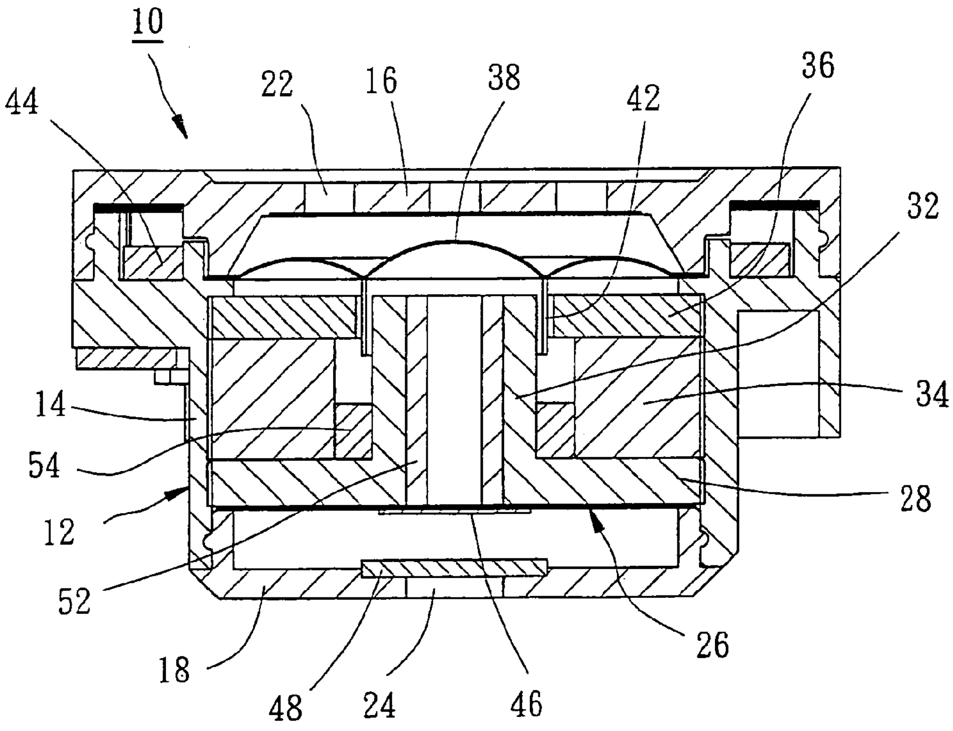
FIG. 2 is a sectional view of a receiver according to a first preferred embodiment of the present invention.

Referring to FIG. 2, a receiver 10 in accordance with the first embodiment of the present invention is shown comprising:

a housing 12, which is comprised of a barrel-like plastic yoke holder 14, a disk-like plastic front cover plate 16 covering the front side of the plastic yoke holder 14, the plastic front cover plate 16 having a plurality of sound holes 22 extended through the front and back sides, and a disk-like plastic rear cover plate 18 covering the rear side of the plastic yoke holder 14, the plastic rear cover plate 18 having an air hole 24 extended through the front and back sides at the center;

a rear yoke 26 mounted inside the housing 12, the rear yoke 26 having an annular base 28 spaced from the rear cover plate 18 at a distance, and a tubular body 32 forwardly extended from the inner diameter of the annular base 28 and spaced from the plastic front cover plate 16 at a distance (according to this embodiment, the annular base 28 and the tubular body 32 are formed integral with each other; alternatively, the annular base 28 and the tubular body 32 can be separately made and then fastened together without affecting the performance of the receiver);

an annular magnet 34 disposed around the tubular body 32 of the rear yoke 26 without touching the periphery of the tubular body 32 and stopped at the front side of the annular base 28;

a front yoke 36 disposed around the tubular body 32 of the rear yoke 26 and stopped at the front side of the annular magnet 34;

a vibration diaphragm 38 mounted inside the housing 12 and peripherally affixed to the front side of the yoke holder 14 in front of the yokes 26 and 36;

a voice coil 42 connected to the back side of the vibration diaphragm 38 at the center and suspended in an annular space between the front yoke 36 and the tubular body 32 of the rear yoke 26;

a coupling voice coil 44 mounted inside the housing 12 around the vibration diaphragm 38;

a first acoustic paper 46 bonded to the annular base 28 of the rear yoke 26 to block the rear open side of the tubular body 32 of the rear yoke 26;

a second acoustic paper 48 bonded to the plastic rear cover plate 18 of the housing 12 at the center to block the air hole 24 (the back side of the housing, i.e., the plastic rear cover plate 18 may be made having a plurality of air holes that are blocked by the second acoustic paper);

a first cushion 52 made of rubber and shaped like a tube and coaxially mounted inside the tubular body 32 of the rear yoke 26 to reduce the cross section of the passage (the bore of the tubular body 32) between the front and rear sides of the rear yoke 26 and to enhance sound absorbing power, keeping the periphery in close contact with the inner diameter of the tubular body 32 and the front and rear ends in flush with the front and rear ends of the tubular body 32; and a second cushion 54 made of rubber in annular shape and disposed around the tubular body 32 of the rear yoke 26 and stopped between the outside wall of the tubular body 32 and the inside wall of the magnet 34, that is, the second cushion is mounted in an annular gap between said annular magnet 34 and the tubular body 32 of said rear yoke.

According to this embodiment, the axial thickness of the second cushion 54 is about one half of the magnet 34, and the second cushion 54 is stopped at the front side of the annular base 28 of the rear yoke 26, i.e., the distance between the front side of the second cushion 54 and the rear side of the front yoke 36 is about one half of the thickness of the magnet 24. By means of the arrangement of the second cushion 54, the depth of the gap from the vibration diaphragm 38 between the magnet 34 and the tubular body 32 is shortened.

Figure 3:
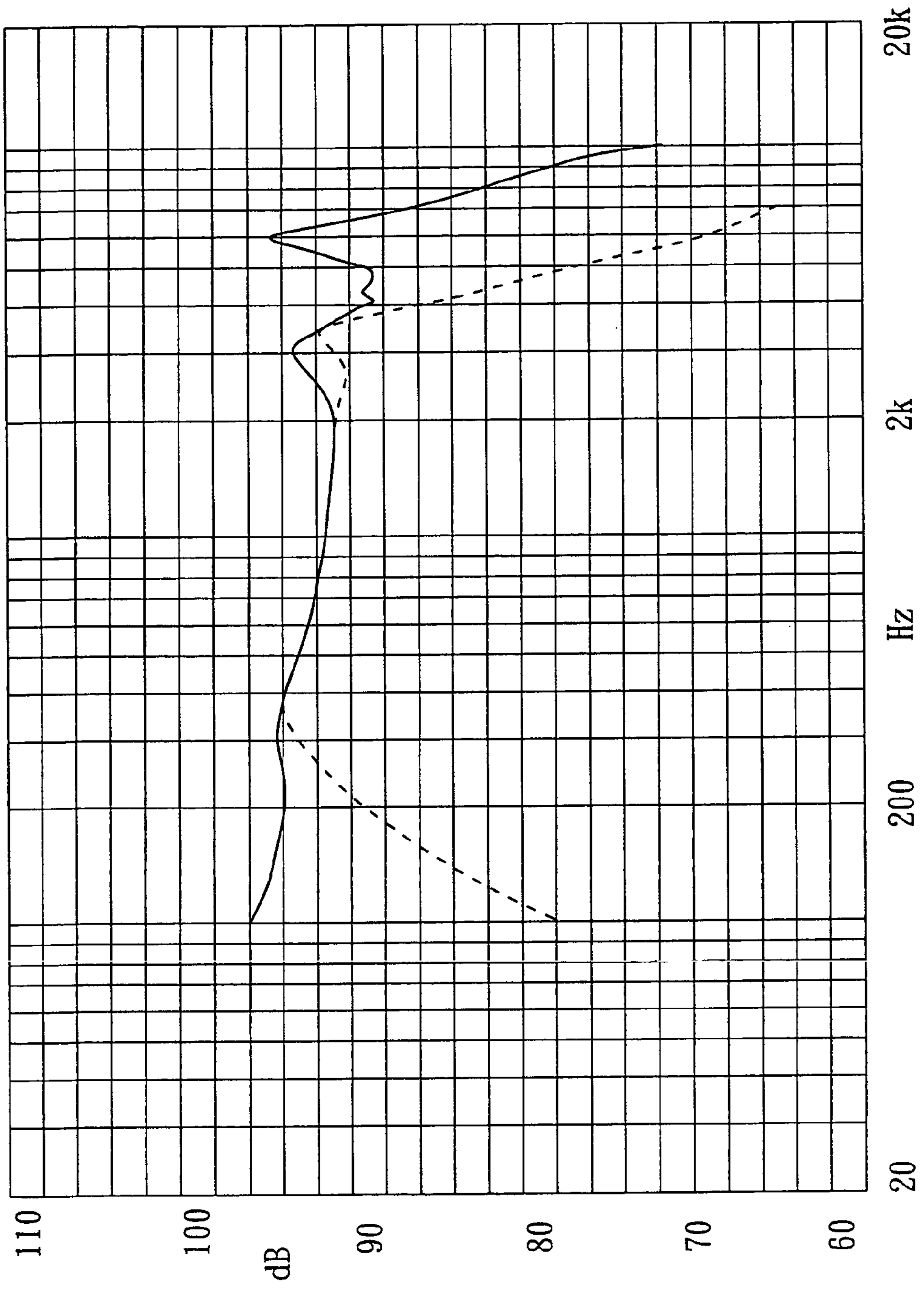
FIG. 3 is a comparison chart showing a frequency response curve obtained from the receiver of the present invention and a frequency response curve obtained from the receiver of the prior art design.

The above description well describes the structural features of the receiver 10 according to the first embodiment of the present invention (remark: the arrangement of the vibration voice coil 42 and the coupling voice coil 44 is of the known art, no further detailed description in this regard is necessary). By means of the aforesaid structure, the flat segment of the frequency response curve of the receiver 10 extends relatively wider than conventional designs. In detail, the presence of the air hole 24 at the rear side of the housing 12 and the arrangement of the second acoustic paper 48 greatly improve frequency response to low frequency, i.e. the flat segment of the frequency response curve extends in direction toward lower frequency area. FIG. 3 is a comparison chart showing a frequency response curve obtained from the receiver 10 of the present invention and indicated by real line, and a frequency response curve obtained from the receiver of the prior art design and indicated by imaginary line. As illustrated, the flat segment of the frequency response curve obtained according to the present invention extends to about 150 Hz or even about 100 Hz in low frequency area. In comparison to the sudden drop of the curve obtained according to the prior art design at 300 Hz, the invention achieves a better performance at low frequency. Further, the arrangement of the two rubber cushions 52 and 54 changes the shape and material quality of the internal space of the receiver to reduce the inertia of the vibration diaphragm 38 during vibration, enabling the flat segment of the frequency response curve to extends in direction toward higher frequency area. As illustrated in FIG. 3, the frequency response curve obtained according to the present invention starts to drop after extended to 6 k Hz at high frequency area. In comparison to the frequency response curve obtained according to the prior design that starts to drop at about 4 k Hz, the invention achieves a better performance at high frequency.

As indicated above, the flat segment of the frequency response curve obtained according to the present invention extends relatively wider, i.e. the receiver of the present invention is capable of receiving input signal of relatively higher frequency and relatively lower frequency, and keeping a constant output power. Further, the improvement (structural characteristics) of the invention does not increase the dimension and thickness of the receiver, i.e., maintains the compact outer appearance of the receiver for use in cellular telephone or any of a variety of small apparatus.

Figure 4:
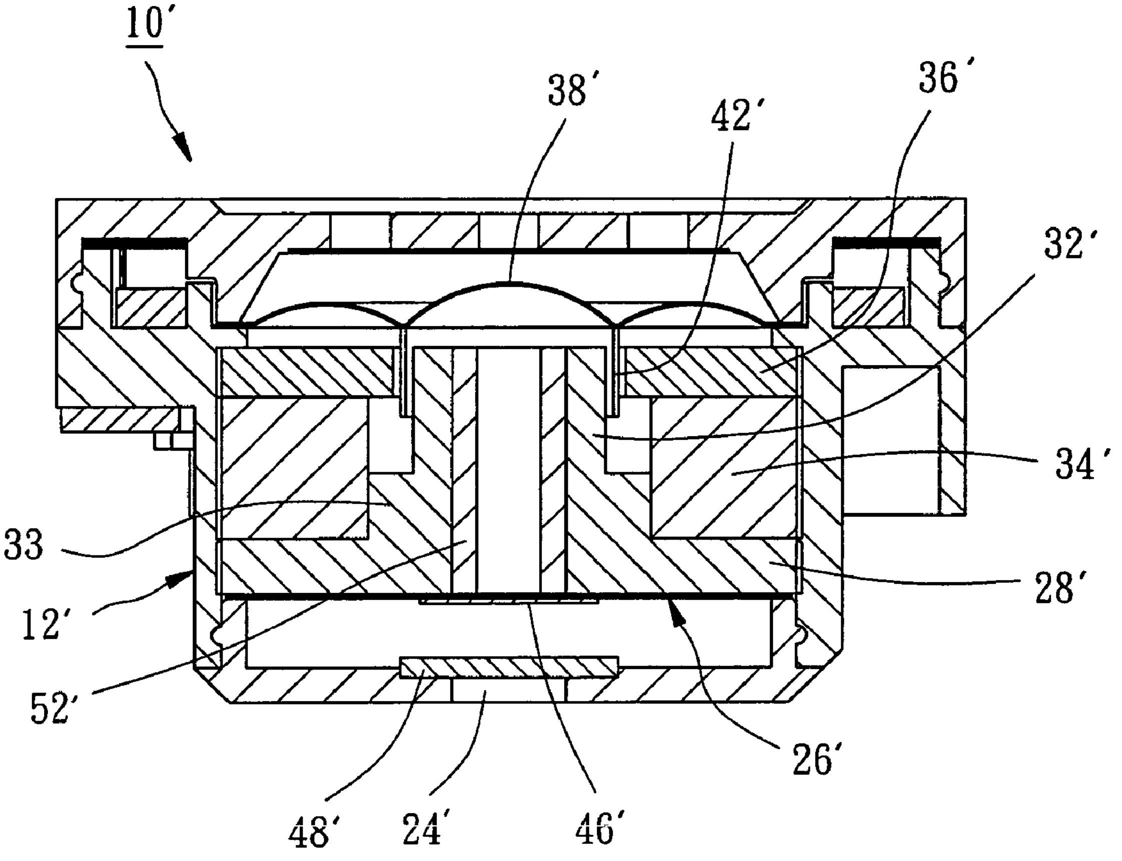
FIG. 4 is a sectional view of a receiver according to a second preferred embodiment of the present invention.

FIG. 4 shows a receiver 10' constructed according to the second embodiment of the present invention. Similar to the aforesaid first embodiment of the present invention, the receiver 10' comprises a housing 12', a rear yoke 26' at a rear side inside the housing 12', an annular magnet 34' supported on the front side of the annular base 28' of the rear yoke 26', a front yoke 36' disposed at the front side of the annular magnet 34', a vibration diaphragm 38' stretched in front of the front yoke 36', a voice coil 42' connected to the back side of the vibration diaphragm 38', and a first acoustic paper 46' covering the rear open side of the tubular body 32' of the rear yoke 26', a second acoustic paper 48' covering the center air hole 24' at the rear side of the housing 12', and a tubular rubber cushion 52' fitted into the inside of the tubular body 32' of the rear yoke 26'. This embodiment eliminates the aforesaid second cushion 54. To substitute for the aforesaid second cushion 54, the tubular body 32' of the rear yoke 26' is made having an annular step 33 (comparing FIG. 4 to FIG. 2). The annular step 33 is formed integral with the connection area between the tubular body 32' and the annular base 28', having the periphery disposed in contact with the inner diameter of the annular magnet 34'. The axial thickness of the annular step 33 is one half of the thickness of the magnet 34'. Therefore, the depth of the gap from the vibration diaphragm 38' between the magnet 34' and the tubular body 32' is shortened. This embodiment achieves same frequency response improvement.

What is claimed is:

1. A receiver comprising:

a housing having a front side, a rear side, and a plurality of sound holes extended through said front side;

a rear yoke mounted inside said housing, said rear yoke having an annular base spaced from the rear side of said housing at a distance, and a tubular body forwardly extended from said annular base;

an annular magnet disposed around the tubular body of said rear yoke and stopped at a front side of said annular base;

a front yoke disposed around the tubular body of said rear yoke and stopped at a front side of the annular magnet;

a vibration diaphragm mounted inside said housing and stretched in front of said rear yoke and said front yoke;

a voice coil connected to a back side of said vibration diaphragm and suspended in an annular space between said front yoke and the tubular body of said rear yoke; and a first acoustic paper bonded to the annular base of said rear yoke to block said tubular body of said rear yoke;

wherein said housing has at least one air hole in the rear side and a second acoustic paper blocking said at least one air hole; a first cushion is mounted inside the tubular body of said rear yoke, said first cushion being a tubular member having a periphery thereof disposed in contact with an inner diameter of the tubular body of said rear yoke; a second cushion mounted in an annular gap between said annular magnet and the tubular body of said rear yoke, said second cushion being an annular member having inner and outer diameters respectively disposed in contact with a periphery of the tubular body of said rear yoke and an inner diameter of said annular magnet and spaced from said front yoke at a distance.

2. The receiver as claimed in claim 1, wherein said first cushion and said second cushion are respectively made of rubber.

3. The receiver as claimed in claim 1, wherein said first cushion has front and rear sides thereof disposed in flush with front and rear sides of the tubular body of said rear yoke.

4. The receiver as claimed in claim 1, wherein said second cushion is stopped at the front side of the annular base of said rear yoke.

5. The receiver as claimed in claim 4, wherein an axial thickness of said second cushion is about one half of an axial thickness of said annular magnet.

6. A receiver comprising:

a housing having a front side, a rear side, and a plurality of sound holes extended through said front side;

a rear yoke mounted inside said housing, said rear yoke having an annular base spaced from the rear side of said housing at a distance, and a tubular body forwardly extended from said annular base;

an annular magnet disposed around the tubular body of said rear yoke and stopped at a front side of said annular base;

a front yoke disposed around the tubular body of said rear yoke and stopped at a front side of the annular magnet;

a vibration diaphragm mounted inside said housing and stretched in front of said rear yoke and said front yoke;

a voice coil connected to a back side of said vibration diaphragm and suspended in an annular space between said front yoke and the tubular body of said rear yoke; and a first acoustic paper bonded to the annular base of said rear yoke to block said tubular body of said rear yoke;

wherein said housing has at least one air hole in the rear side and a second acoustic paper blocking said at least one air hole; a cushion is mounted inside the tubular body of said rear yoke, said cushion being a tubular member having a periphery thereof disposed in contact with an inner diameter of the tubular body of said rear yoke; said rear yoke has an annular step extended around a periphery of said tubular body and disposed in contact with an inner diameter of said annular magnet and spaced from said front yoke at a distance.

7. The receiver as claimed in claim 6, wherein said cushion is made of rubber.

8. The receiver as claimed in claim 6, wherein said cushion has front and rear sides thereof disposed in flush with front and rear sides of the tubular body of said rear yoke.

9. The receiver as claimed in claim 6, wherein said annular step of said rear yoke is formed integral with a connection area between the tubular body and annular base of said rear yoke.

10. The receiver as claimed in claim 9, wherein an axial thickness of said annular step is about one half of that of said annular magnet.

* * * * *